United States Patent
Lim et al.

(10) Patent No.: US 8,224,807 B2
(45) Date of Patent: Jul. 17, 2012

(54) ENHANCED UTILIZATION OF QUERY OPTIMIZATION

(75) Inventors: Sau Boon Lim, Marine Terrace (SG); Edwin Anthony Seputis, Oakland, CA (US)

(73) Assignee: Sybase, Inc., Dublin, CA (US)

(*) Notice: Subject to any disclaimer, the term of this patent is extended or adjusted under 35 U.S.C. 154(b) by 288 days.

(21) Appl. No.: 12/758,470

(22) Filed: Apr. 12, 2010

(65) Prior Publication Data

US 2011/0252020 A1    Oct. 13, 2011

(51) Int. Cl.
    *G06F 17/30* (2006.01)
(52) U.S. Cl. .................... 707/713; 707/803
(58) Field of Classification Search .............. None
    See application file for complete search history.

(56) References Cited

U.S. PATENT DOCUMENTS

| 6,338,056 B1* | 1/2002 | Dessloch et al. ............ 707/711 |
| 7,580,920 B2* | 8/2009 | Freedman et al. ............... 1/1 |
| 2007/0043697 A1* | 2/2007 | Driesch et al. .................. 707/2 |

OTHER PUBLICATIONS

Nicolas Bruno and Surajit Chaudhuri, "Exploiting Statistics On Query Expressions For Optimization", SIGMOD 2002 ACM International Conference on Management of Data, pp. 1-12.*

* cited by examiner

*Primary Examiner* — Cheryl Lewis
(74) *Attorney, Agent, or Firm* — Sterne, Kessler, Goldstein & Fox PLLC (57) ABSTRACT

System, method, computer program product embodiments and combinations and sub-combinations thereof for enhanced utilization of query optimization in a database system are provided. In an embodiment, query optimization of the database system is augmented to include statistics on temporary tables through an implicit update statistics option. Further, a statistics update is generated in the database system on a first optimizable query referencing at least one optimizable column of a temporary table when statistics for the at least one optimizable column are not already available.

21 Claims, 7 Drawing Sheets

ENHANCED UTILIZATION OF QUERY OPTIMIZATION

BACKGROUND

1. Field of the Invention

The present invention is directed to enhanced utilization of query optimization of a database system, particularly through substantially automatic maintenance of statistics for temporary tables.

2. Background Art

Computers are very powerful tools for storing and providing access to vast amounts of information. Databases are a common mechanism for storing information on computer systems while providing easy access to users. A typical relational database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details.

One purpose of a database system is to answer queries requesting information from the database. A query may be defined as a logical expression over the data and the data relationships set forth in the database, and execution of a query results in the identification of a subset of the database. In operation, for instance, the execution of a request for information from a relational DBMS is typically issued by a client system as one or more Structured Query Language or "SQL" queries for retrieving particular data (e.g., a list of all employees earning more than $25,000) from database tables on a server. In response to this request, the database system typically returns the names of those employees earning $25,000, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component of the DBMS called the optimizer determines the "plan" or the best method of accessing the data to implement the SQL query. The query optimizer is responsible for transforming a SQL request into an access plan composed of specific implementations of the algebraic operator selection, projection, join, and so forth. The role of a query optimizer in a relational DBMS system is to find an adequate execution plan from a search space of many semantically equivalent alternatives.

During typical query optimization, the optimizer chooses a plan which is estimated to be least costly. To achieve that goal, the optimizer typically relies on statistics about the tables, indexes, partitions, and columns referenced in a query for estimating the cost, usually in terms of I/O and CPU time of different possible query plans. The optimizer then chooses the query plan method that has the lowest cost. However, this cost estimate cannot be accurate if the statistics themselves are not accurate. As a result, inaccurate statistics could lead to a suboptimal choice of plans and result in slower performance than necessary. As optimizer capabilities become more complex in keeping with enhancements to database management systems, their choices increase, making statistics more important to help avoid generating a suboptimal query plan. Generally, it is the responsibility of the database administrator (DBA) to schedule and run an update statistics procedure. Unfortunately, reliance on a DBA is not optimal, since human nature may result in non-compliance, particularly for operations related to transient table use during database processing.

Accordingly, a need exists for an approach to providing enhanced utilization of query optimization that takes into account temporary table statistics. The present invention provides a solution for this and other needs.

BRIEF SUMMARY

Briefly stated, the invention includes system, method, computer program product embodiments and combinations and sub-combinations thereof for enhanced utilization of query optimization in a database system. In an embodiment, query optimization of the database system is augmented to include statistics on temporary tables through an implicit update statistics option. Further, a statistics update is generated in the database system on a first optimizable query referencing at least one optimizable column of a temporary table when statistics for the at least one optimizable column are not already available.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for enhanced utilization of query optimization, particularly through substantially automatic maintenance of statistics for temporary tables.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
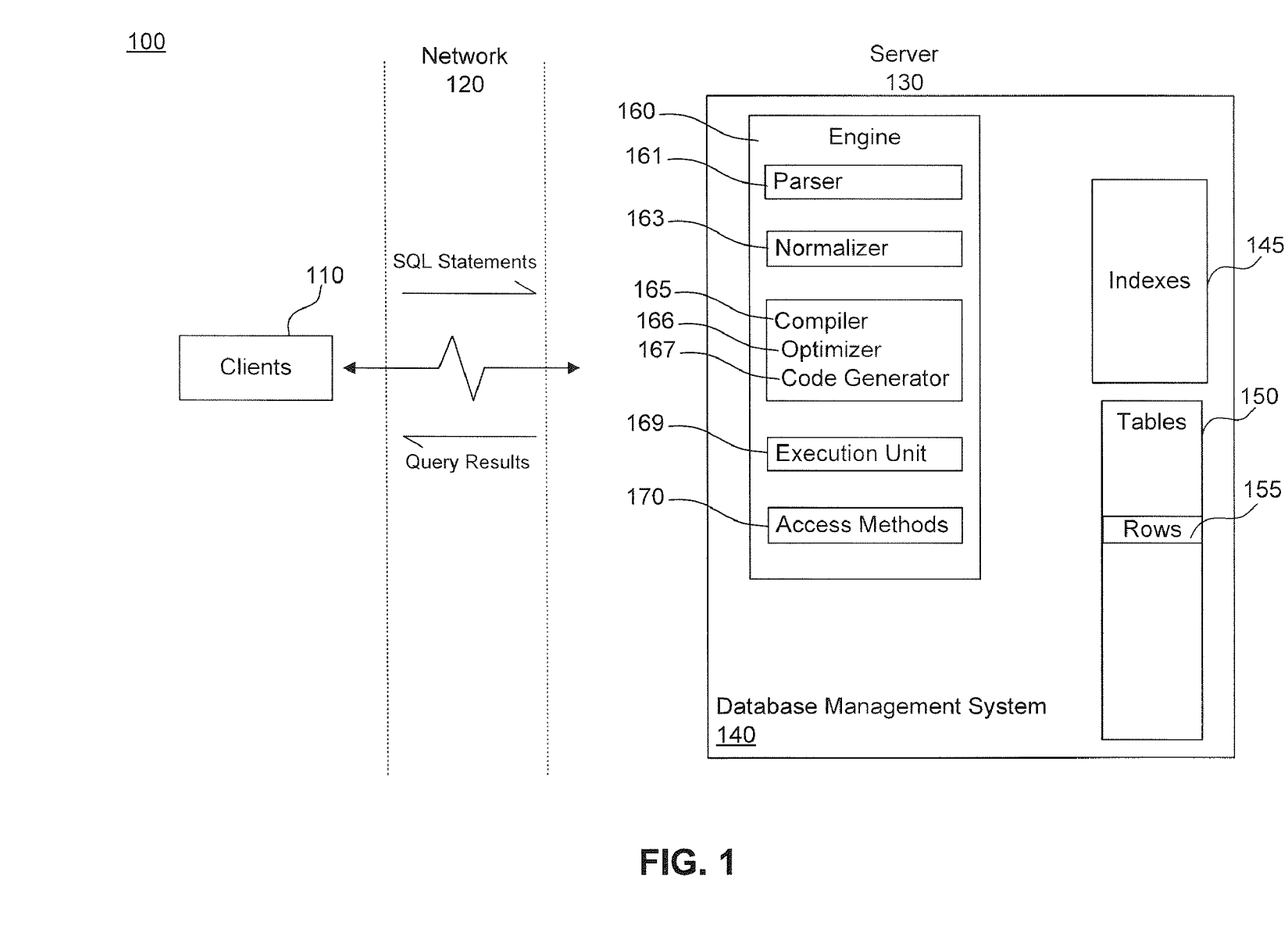
FIG. 1 illustrates an exemplary database management system (DBMS), according to an embodiment of the invention.

Embodiments of the invention may operate in the example client/server database system 100 shown in FIG. 1. System 100 includes one or more clients 110 in communication with a server 130 via a network 120. A database management system (DBMS) 140 resides in the server 130. It is noted that the example client/server database system 100 is shown in FIG. 1 and discussed herein solely for purposes of illustration, and not limitation. The invention is not limited to the example of FIG. 1.

In operation, clients 110 store data in, or retrieve data from, rows 155 of database tables 150 by issuing SQL statements to DBMS 140. Generally, data in a relational database is stored as a series of tables, also called relations. Typically resident on the server 130, each table itself comprises one or more "rows" or "records" (tuples). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of SQL. SQL statements may be divided into two categories: data manipulation language (DML), used to read and write data; and data definition language (DDL), used to describe data and maintain the database. DML statements are also called queries. In operation, for example, the clients 110 issue one or more SQL commands to the server 130. SQL commands may specify, for instance, a query for retrieving particular data (i.e., data records meeting the query condition) from the database table(s) 150. In addition to retrieving the data from database server table(s) 150, the clients 110 also have the ability to issue commands to insert new rows of data records into the table(s), or to update and/or delete existing records in the table(s).

In operation, DBMS 140 has a certain amount of memory at the server 130 available for its use. All data in a typical relational database system is stored in pages on a secondary storage device, usually a hard disk. Typically, these pages may range in size from 1 Kb (kilobyte) to 32 Kb, with the most common page sizes being 2 Kb and 4 Kb. All input/output operations (I/O) against secondary storage are done in page-sized units. i.e., the entire page is read/written at once. The memory in which pages that have been read from disk reside is called the cache or buffer pool.

SQL statements received from clients 110 are processed by query engine 160 of the DBMS 140. In an embodiment, query engine 160 comprises parser 161, normalizer 163, compiler 165, query optimizer 166, code generator 167, execution unit 169 and access methods 170, which shall now be generally described.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant data. Additionally, the normalizer 163 may perform error checking, such as confirming that table names and column names which appear in the query are valid (e.g., are available and belong together). Finally, the normalizer 163 may also look up any referential integrity constraints which exist and add those to the query.

After normalization, the query tree is passed to the compiler 165, which includes query optimizer 166 and a code generator 167. Query optimizer 166 is responsible for optimizing the query tree. A general goal of a query optimizer is to speed up the process of executing a query and returning the results. In an embodiment, query optimizer 166 performs a cost-based analysis for formulating a query execution plan. Query optimizer 166 will, for example, select the join order of tables, and select relevant indexes when available. Query optimizer 166, therefore, performs an analysis of the query and determines the best execution plan, from a plurality of generated execution plans, and where "best" is judged according to any defined criteria, which in turn results in particular access methods 170 being invoked during query execution by the execution unit 169.

Generally, during query optimization, the optimizer 166 chooses a plan which is estimated to be least costly. To achieve that goal, the optimizer 166 typically relies on statistics about the tables, indexes, partitions, and columns referenced in a query for estimating the cost in terms of I/O and CPU time of different possible query plans. The optimizer 166 then chooses the query plan method that has the lowest cost. However, this cost estimate cannot be accurate if the statistics themselves are not accurate. As a result, inaccurate statistics could lead to a suboptimal choice of plans and result in slower performance than necessary. Some statistics, such as the number of pages or rows in a table, are updated automatically during query processing and usually are stored in a system catalog, e.g., "systabstats". Other statistics, notably the histograms on columns, as well as density information, (typically stored in a system table, e.g., "sysstatistics"), are updated only when an explicit command, e.g., 'update statistics', runs, or when indexes are created, as is well understood in the art.

In practice, it is critical that the histograms be available and up to date, such as in the latest version of Adaptive Server Enterprise (ASE), Sybase's flagship database, which is more susceptible to statistics issues than previous ASE releases due to now having multiple algorithms for sorting, grouping, unions, joining and other operations, thus offering the optimizer 166 many more possible choices. In addition, statistics are used now in more ways, for example, for determining more accurate join cardinality estimates in multitable queries to more accurately predict materialization costs for sort and hash operations. Good statistics are therefore important to ensure that the database performance occurs optimally, and more particularly, to help avoid generating a suboptimal query plan.

One aspect of performance where a lack of statistics has been recognized by the inventors as leading to suboptimal query performance relates to queries involving temporary tables. Generally, database applications rely on temporary workspace where intermediate results and data that do not need to be persistent can be stored. In ASE, for example, this workspace is provided in the form of a special system-provided database called "tempdb". Simply stated, it is a scratch pad database that gets recreated when the database server is rebooted. Temporary tables, having a name starting with the "#" character, are a well-known feature of ASE, e.g., a query may build a temporary table to assist it, or the optimizer 166 may decide to create a temporary table to assist itself. These temporary tables are session-specific, with the data existing for the duration of the session, such that each session can only see and maintain its own data, and de-allocation of the temporary tables occurs at the end of the session.

Figure 2:
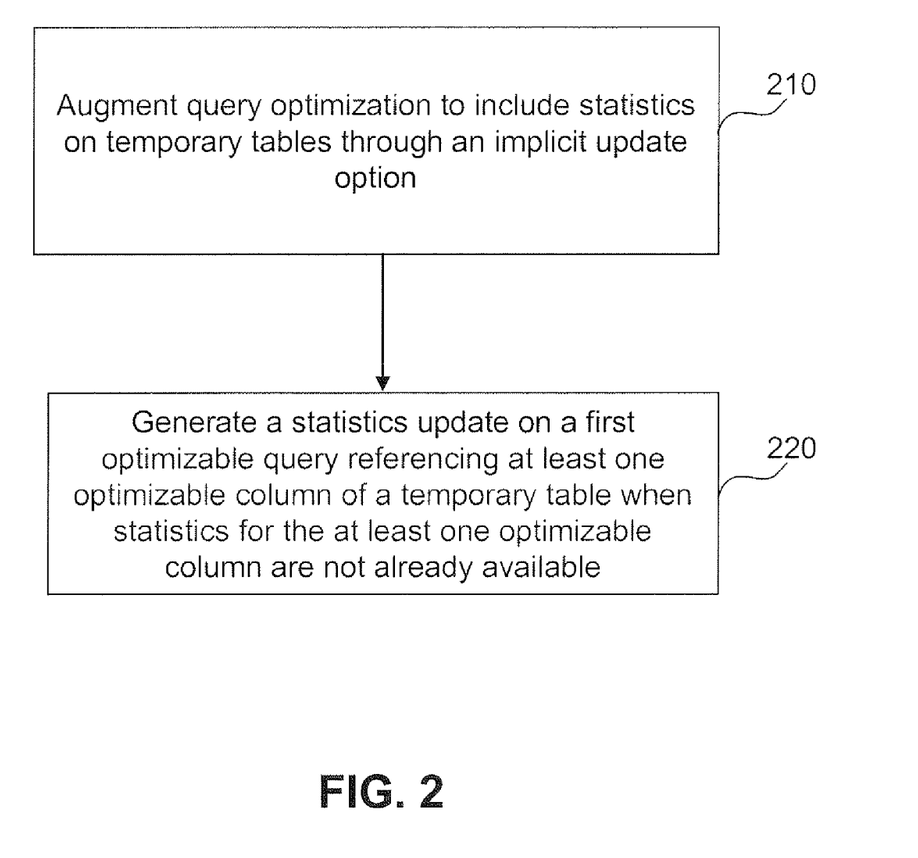
FIG. 2 depicts a block flow diagram of enhanced utilization of query optimization in accordance with an embodiment of the invention.

Heavy usage of tempdb storage due to query processing activities can degrade performance due to contention on tempdb system catalogs as well as the tempdb log, as is well understood in the art. The heavy usage can also degrade performance when accurate statistics are unavailable for the temporary tables utilized during query processing. While an optimizer 166 may be able to base evaluations relative to temporary tables on some "magic" numbers or guesses when statistics are not explicitly updated on the tables, the magic numbers are not as accurate or useful as those that would be available if an "update statistics" command were explicitly done on the private temporary tables. However, this requires reliance on a DBA, who, in observed practice, is likely to avoid the extra effort, since, heretofore, many have been unwilling to change their stored procedures to include the "update statistics" command, hampering the ability to achieve more optimal performance In an embodiment, an approach is provided for enhanced utilization of query optimization that takes into account temporary table statistics, as represented in the overall block flow diagram of FIG. 2. As shown, the approach initiates by augmenting query optimization to include statistics on temporary tables through an implicit update option (block 210). The implicit update option is suitably provided via a trace flag, e.g., a dbcc (database consistency checker) trace flag that can be disabled by default and set as a result of selection of an optimization criterion (e.g., "auto_temptable_stats") or using a "dbcc traceon" command in an ASE implementation, to indicate to the optimizer 166 that #temp table statistics are to be used as optimization criteria. It should be appreciated that although reference is made to a dbcc trace flag, this is meant as illustrative of capable functionality, where trace flags are generally used to change the behavior of the server, to see why a certain query plan is chosen, or to fine-tune the optimizer, as is well understood in the art. When set, the statistics update is generated on a first optimizable query referencing at least one optimizable column of a temporary table when statistics for the respective column are not already available (block 220), as described in further detail with reference to the block flow diagram of FIG. 3. As used herein, an optimizable column refers to one in which the availability of statistics on that column can influence the optimizer and thereby affect query plan selection.

Figure 3:
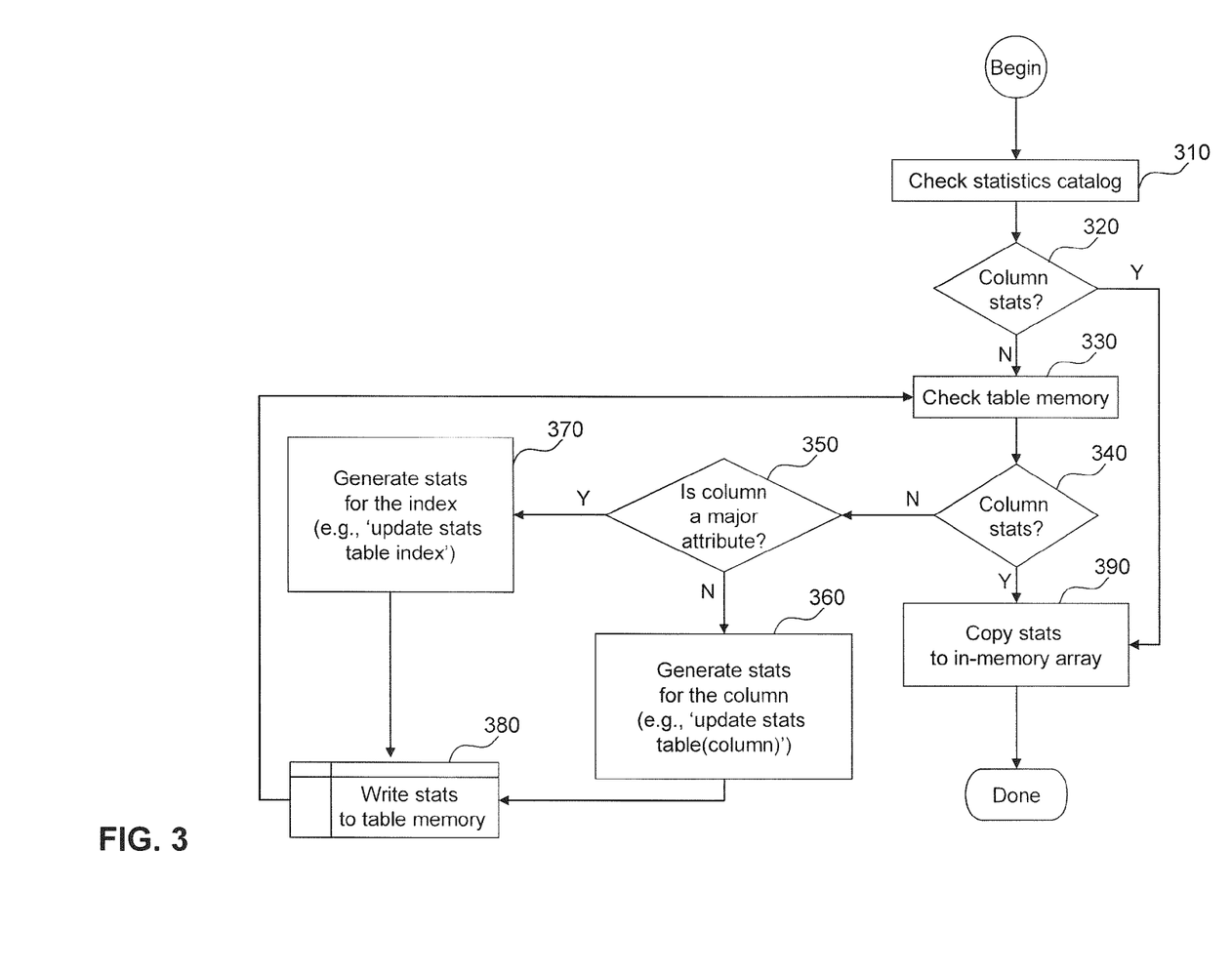
FIG. 3 depicts a block flow diagram of details of statistics generation of FIG. 2 in more detail in accordance with an embodiment of the invention.

Referring now to FIG. 3, on any optimizable query referencing the temporary table, the optimizer 166 attempts to retrieve statistics information from a system catalog (e.g., the sysstatistics catalog) (blocks 310, 320) or any previously created in-memory statistics (blocks 330, 340). When statistics for a column are not found to be already available, an implicit update statistics for the column is performed, according to whether the column is a major attribute or not (blocks 350, 360, 370). In an embodiment, the preference is to run "update statistics <table> <index>", if possible, over "update statistics <table> (<column>)", since the former is more efficient, because the latter uses a sort node not required by the former. The end result of both commands are essentially equivalent, except that the <index> form will also create multi-attribute statistics for any multi-attribute index. Once generated, the statistics are written to memory (block 380).

In an embodiment, the automatically generated statistics are transient, non-disk resident data stored in-memory, with an assumption that there is no concurrent access to them. By putting the generated statistics in-memory, tempdb contention is avoided on a sysstatistics update. Further, generating statistics only for columns with missing statistics provides substantially equivalent performance of an explicit 'update statistics table(col)' or 'update statistics table index' operation.

Figure 4A:
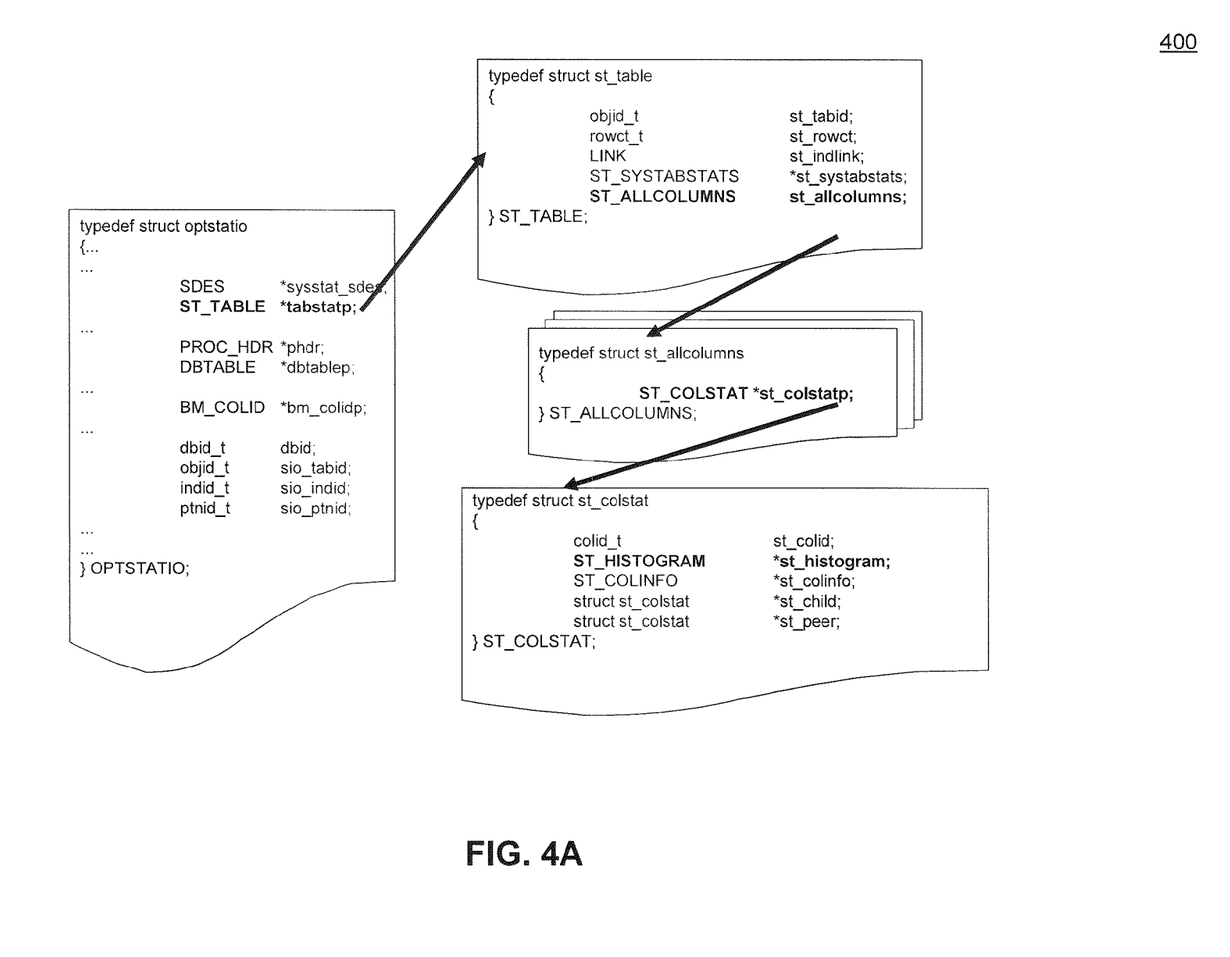
FIGS. 4A-C depict diagrams of interaction among data structures utilized when generating statistics in accordance with an embodiment of the invention.
Figure 4B:
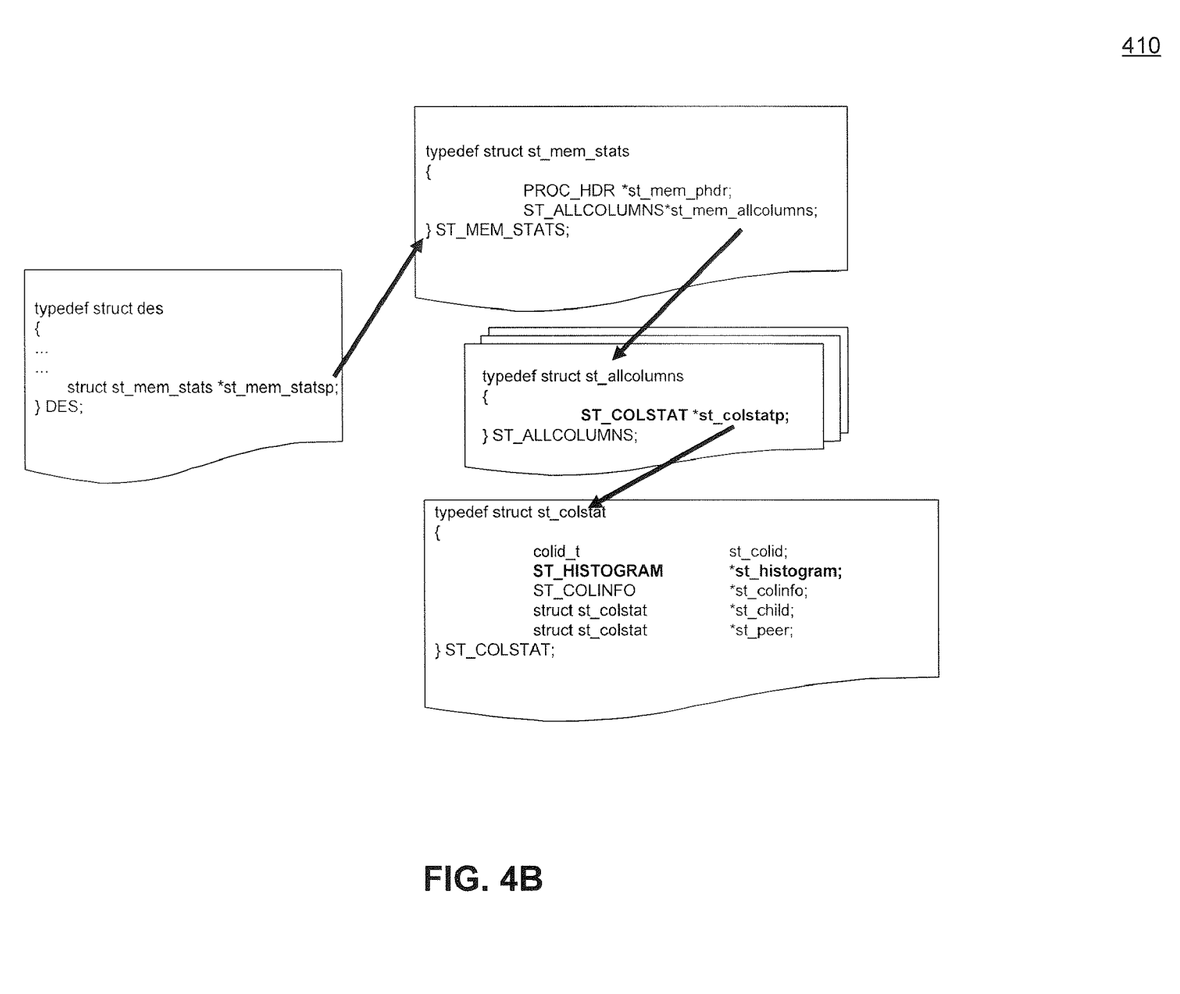
Figure 4C:
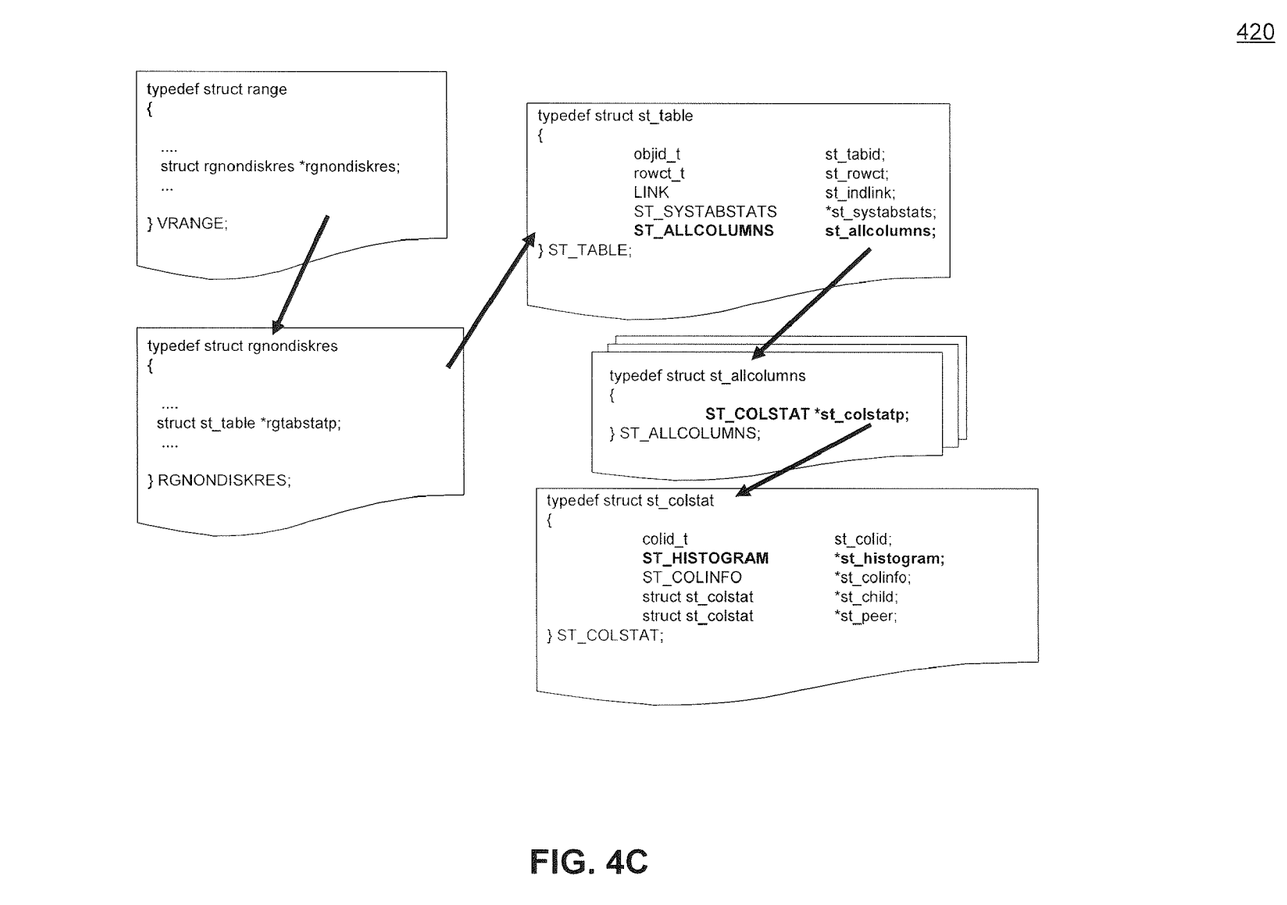

FIGS. 4A-C illustrate example diagrams 400, 410, 420 of the interaction of data structures utilized during the statistics generation. In an embodiment, procedure cache is used for the memory space created to store the statistics, with the generated statistics tagged onto the table DES so that they exist in the life span of the #temptable, e.g.,

```
typedef struct des
{
    ...
    ...
    struct st_mem_stats *st_mem_statsp;   /* in-memory statistics */
} DES;
```

A memory allocator id is created where the memory allocated is not destroyed between queries, e.g.,

```
    #define MEMC_STATS_7              205
and, an in-memory statistics structure is created, e.g.,
    typedef struct st_mem_stats
    {
        PROC_HDR              *st_mem_phdr;
        ST_ALLCOLUMNS         *st_mem_allcolumns;
    } ST_MEM_STATS;
``` where ST_ALLCOLUMNS contains a linked list of column descriptors which contain statistics. An optimizer statistics I/O interface structure (OPTSTATIO) contains an internal representation of the statistics generated by the internal update statistics routines. The "shadow" indications shown in FIGS. 4A, 4B, and 4C for ST_COLSTAT indicate that there likely is a list of ST_COLSTAT structures associated with ST_ALLCOLUMNS, as is well appreciated by those skilled in the art.

In an embodiment, there are three copies of the statistics created during the optimization. Copy #1 in OPTSTATIO→ST_TABLE→ST_ALLCOLUMNS is created during the update statistics and is dropped once work is completed for st_mem_stats of the DES. Copy #2 in st_mem_stats→ST_ALLCOLUMNS is "persistent" until the temporary table is dropped. Copy #3 in VRANGE→RGNONDISKRES→ST_TABLE→ST_ALL COLUMNS is manipulated and dropped after the optimization is completed, since there are manipulations of the statistics that would render the copy unusable for subsequent operations, i.e., copy #2 is a "pristine" form that is copied by every subsequent optimization referencing the temp table.

Copy #1 is associated with block 380 of FIG. 3, where the OPTSTATIO instance is created and there is a copy to st_mem_stats structure. Copy #2 is the memory persistent copy in st_mem_stats associated with the check in block 330 of FIG. 3. Copy #3 is associated with block 390, where a copy is made from st_mem_stats to the VRANGE ST_TABLE. OPTSTATIO copy #1 is not used directly in the st_mem_stats copy #2, since during the update statistics operation, several extraneous bits of memory are allocated during statistics gathering, and since copy #2 is to persist until the #temptable is dropped, only the "essence" of the final stats from OPTSTATIO is copied to the st_mem_stats copy #2, which alleviates the extraneous memory associated with OPTSTATIO.

Through the approach of the present invention, statistics are only created incrementally on an as-needed basis, i.e. the minimal statistics are generated on the fly to fully support the current columns involved in the running query, rather than requiring a brute force update on all statistics for all columns. Further, if explicit statistics are created through existing mechanisms (such as, update statistics, create index, or edited optdiag statistics, etc.) on #temporary tables, then these statistics have precedence over any in-memory statistics which have been created, and would suppress any redundant creation of in-memory statistics on subsequent optimizations.

By way of example, suppose there is the following command sequence:
   create table #t1 (a int, b int, c int)
   insert some rows . . .
   update statistics #t1(*b*)
   select * from #t1 where a=1
   select * from #t1 where a=1 and b=10 and c=100
In accordance with an embodiment of the invention, the generation of in-memory statistics is triggered for column 'a' upon the execution of the first "select *" statement. When the second "select *" statement executes, generation of statistics only need occur for column 'c', since the statistics for column 'b' would already be available as a result of the explicit "update statistics" command, and those for column 'a' would already be available as a result of the previous "select *" command.

Similar to the above example, suppose there is the following command sequence:
   create table #t1 (a int, b int, c int)
   create index i1 on #t1(a)
   insert some rows . . .
   update statistics #t1(b)
   select * from #t1 where a=1
   select * from #t1 where a=1 and b=10 and c=100
Normally, "create index" will create statistics on the leading column of the index, except in the case where the table is empty. If rows are subsequently inserted into the #temp table, then the first optimizable query needing statistics on that leading column will use the more efficient "update statistics <table> <index>". Thus, in this example, "update statistics #t1 i1" can be used to gather statistics for column "a", whereas in the former example "update statistics #t1 (*a*)" would be used during the implicit update statistics approach.

Further, in view of the presence of perhaps a large amount of data in the temporary table, in an embodiment, the amount of time spent generating the in-memory statistics through an implicit update approach is limited, e.g., to 1000 data pages, since, for temporary tables, it is expected that typical table sizes are significantly smaller, and for columns which are not the major attribute of an index, the 1000 pages would limit the tempdb space used for the implicit sort operations. In situations where the temporary tables have more than 1000 pages, a sampling percent suitably is computed for the statistics gathering process, such that only a chosen number (e.g., 1000) of pages are read, as is well appreciated by those skilled in the art.

Figure 5:
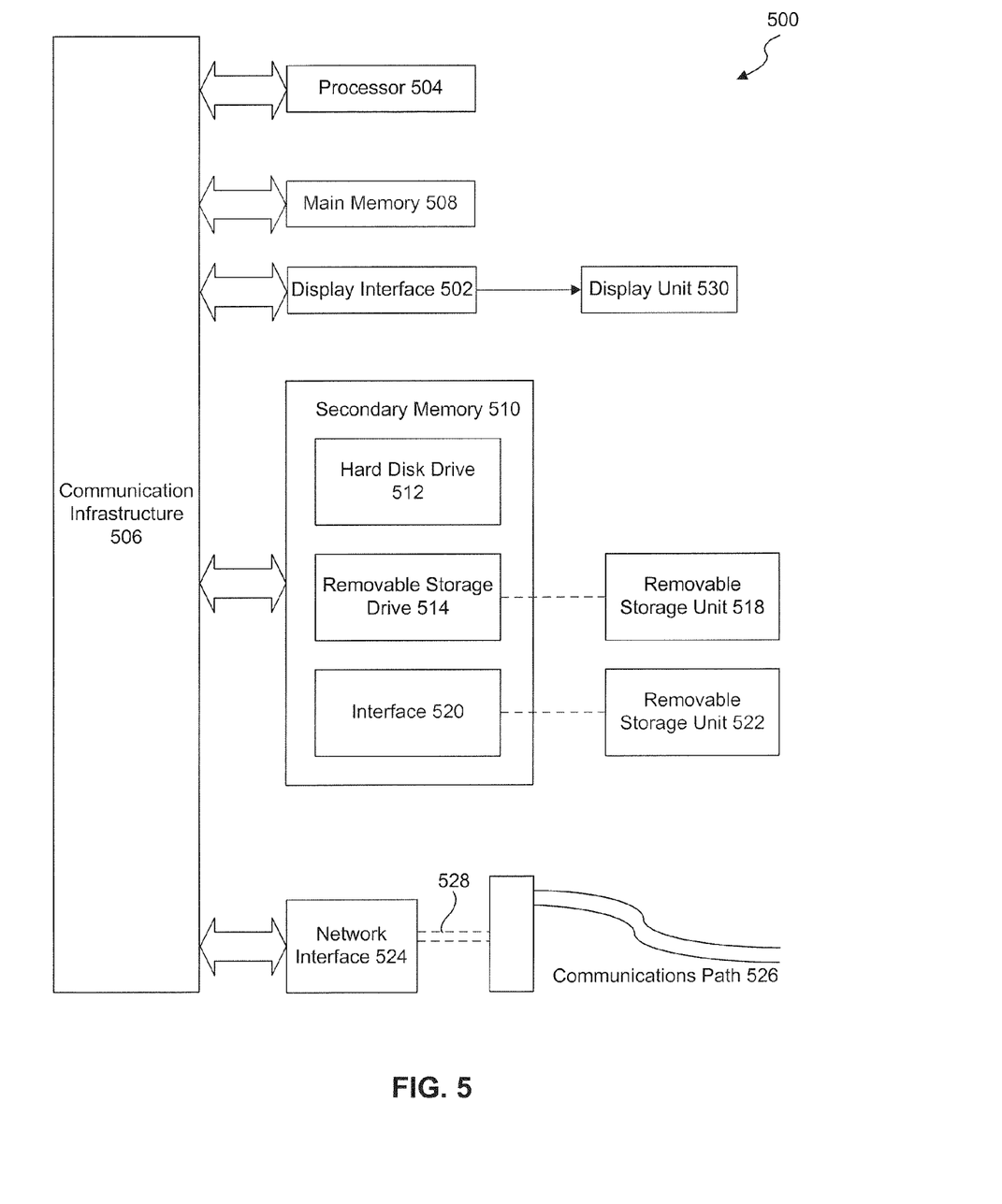
FIG. 5 illustrates an example computer useful for implementing components of embodiments of the invention.

In an embodiment of the present invention, the system and components of embodiments described herein are implemented using well known computers, such as example computer 502 shown in FIG. 5. For example, database management system 140 or server 130 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication bus 504.

The computer 502 also includes a main or primary memory 508, such as random access memory (RAM). The primary memory 508 has stored therein control logic 526A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for enhanced utilization of query optimization in a database system, the method comprising:
    augmenting query optimization of the database system to include statistics on temporary tables through an implicit update statistics option; and
    generating a statistics update in the database system on a first optimizable query referencing at least one optimizable column of a temporary table when statistics for the at least one optimizable column are not already available.

2. The method of claim 1, wherein generating a statistics update further occurs when statistics are not available in a system statistics catalog.

3. The method of claim 2, wherein generating a statistics update further occurs when statistics are not available in temporary table memory space.

4. The method of claim 1, further comprising transiently storing the generated statistics update in memory.

5. The method of claim 4, wherein the generated statistics update exists for the duration of a lifespan of the temporary table.

6. The method of claim 1, further comprising utilizing a sampling percentage of data pages to generate the statistics update.

7. The method of claim 1, wherein augmenting further comprises providing automatic temporary table statistic generation as a selectable optimization option and automatically generating the statistics update on the fly when the optimization option is selected.

8. A system for enhanced utilization of query optimization, the system comprising:
    a server including a memory;
    at least a portion of the memory of the server allocated for temporary tables; and
    a database management system in the server for performing query optimization, the query optimization including an implicit update statistics option for generating a statistics update on a first optimizable query referencing at least one optimizable column of a temporary table when statistics for the at least one optimizable column are not already available.

9. The system of claim 8, wherein the database management system generates the statistics update when statistics are not available in a system statistics catalog.

10. The system of claim 9, wherein the database management system generates the statistics update when statistics are not available in temporary table memory space.

11. The system of claim 8, wherein the database management system transiently stores the generated statistics update in memory.

12. The system of claim 11, wherein the generated statistics update exists for the duration of a lifespan of the temporary table.

13. The system of claim 8, wherein the database management system further utilizes a sampling percentage of data pages to generate the statistics update.

14. The system of claim 8, wherein the database management system further provides the implicit update statistics option as a selectable optimization option for automatic temporary table statistic generation and automatically generates the statistics update on the fly when the optimization option is selected.

15. A computer program product including a non-transitory computer-readable medium having instructions stored thereon that, if executed by a computing device, cause the computing device to perform operations for enhanced utilization of query optimization in a database system, the instructions comprising:
    augmenting query optimization of the database system to include statistics on temporary tables through an implicit update statistics option; and
    generating a statistics update in the database system on a first optimizable query referencing at least one optimizable column of a temporary table when statistics for the at least one optimizable column are not already available.

16. The computer program product of claim 15, wherein generating a statistics update further occurs when statistics are not available in a system statistics catalog.

17. The computer program product of claim 16, wherein generating a statistics update further occurs when statistics are not available in temporary table memory space.

18. The computer program product of claim 15, further comprising transiently storing the generated statistics update in memory.

19. The computer program product of claim 18, wherein the generated statistics update exists for the duration of a lifespan of the temporary table.

20. The computer program product of claim 15, further comprising utilizing a sampling percentage of data pages to generate the statistics update.

21. The computer program product of claim 15, wherein augmenting further comprises providing automatic temporary table statistic generation as a selectable optimization option and automatically generating the statistics update on the fly when the optimization option is selected.

* * * * *